United States Patent
Knowles et al.

(10) Patent No.: US 11,249,032 B2
(45) Date of Patent: Feb. 15, 2022

(54) METHODS AND APPARATUS FOR DETECTING SURFACE DEFECTS ON GLASS SHEETS

(71) Applicant: CORNING INCORPORATED, Corning, NY (US)

(72) Inventors: Jeffrey Allen Knowles, Campbell, NY (US); Correy Robert Ustanik, Davidson, NC (US); Jiaxiang Zhang, Pittsford, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/761,706

(22) PCT Filed: Nov. 9, 2018

(86) PCT No.: PCT/US2018/059921
§ 371 (c)(1),
(2) Date: May 5, 2020

(87) PCT Pub. No.: WO2019/099285
PCT Pub. Date: May 23, 2019

(65) Prior Publication Data
US 2020/0333258 A1  Oct. 22, 2020

Related U.S. Application Data

(60) Provisional application No. 62/586,367, filed on Nov. 15, 2017.

(51) Int. Cl.
*G01N 21/89*   (2006.01)
*G01N 21/896*  (2006.01)
*G01N 21/47*   (2006.01)

(52) U.S. Cl.
CPC .......... *G01N 21/896* (2013.01); *G01N 21/47* (2013.01); *G01N 2021/8967* (2013.01);
(Continued)

(58) Field of Classification Search
CPC ............. G01N 21/896; G01N 21/6428; G01N 21/6452; G01N 15/1475; G01N 21/6458;
(Continued)

(56) References Cited

U.S. PATENT DOCUMENTS 3,954,337 A * 5/1976 Ragland, Jr. ........... G01B 11/02
356/505
5,493,123 A * 2/1996 Knollenberg ...... G01N 21/8806
250/358.1
(Continued)

FOREIGN PATENT DOCUMENTS

CN   101049022 B   12/2010
CN   103913468 A   7/2014
(Continued)

OTHER PUBLICATIONS

International Search Report and Written Opinion of the International Searching Authority; PCT/US2018/059921; dated Feb. 25, 2019; 17 Pages; Korean Intellectual Property Office.

*Primary Examiner* — Michael P Stafira
(74) *Attorney, Agent, or Firm* — Kevin M. Able

(57) ABSTRACT

Methods for detecting defects on the surface of a sheet of material include collimating a beam of light and intersecting the collimated beam of light with a beam splitter. The beam splitter directs a first portion of the intersected beam of collimated light to illuminate a first surface of the sheet, wherein a first portion of the light illuminating the first surface is reflected and a second portion of the illuminating light is scattered by a defect. The reflected and scattered light is received with a first lens element that directs the reflected
(Continued)

and scattered light to an inverse aperture. The reflected light is blocked by the inverse aperture and the scattered light is transmitted by the inverse aperture. The scattered light transmitted by the inverse aperture is directed with a second lens element to an imaging device.

19 Claims, 6 Drawing Sheets

(52) U.S. Cl.
CPC ............... *G01N 2201/064* (2013.01); *G01N 2201/0633* (2013.01); *G01N 2201/06113* (2013.01)

(58) Field of Classification Search
CPC ............. G01N 21/8901; G01N 21/958; G01N 33/54373; G01N 2021/9513; G01N 21/9501; G01N 21/8806; G01N 2021/8825; G01N 2201/06113; G01N 15/0211; G01N 15/14; G01N 15/1429; G01N 15/1434; G01N 2015/0065; G01N 2015/1486; G01N 2021/4716; G01N 2021/4735; G01N 2021/8845; G01N 2021/8887; G01N 2021/8905; G01N 21/4788; G01N 21/64; G01N 21/9036; G01N 21/9054; G01N 21/94; G01N 2201/0627; G01N 2201/0642; G01N 2201/1042; G01N 23/20; G01N 33/386; G01N 37/005; G01N 2021/215; G01N 2021/8427; G01N 2021/8438; G01N 2021/8822; G01N 2021/8893; G01N 21/33; G01N 21/455; G01N 21/8422; G01N 21/8803; G01N 2201/0618; G01N 2291/048; G01N 23/227; G01N 29/28; G01N 21/3581; G01N 21/45; G01N 23/2251; G01N 2201/0612; G01N 2201/12; G01N 2223/611; G01N 23/223; G01N 2291/02491; G01N 2291/02827; G01N 2291/0422; G01N 29/07; G01N 29/4454; G01N 29/46; G01N 2021/8967; G01N 21/47; G01N 2201/0633; G01N 2201/064; G01N 35/00; G01N 2021/95676; G01N 21/956; G01N 21/95607; G01N 22/00; G01N 22/02; G01N 2201/068; G01N 3/00; G01N 33/00; G01N 2021/1793; G01N 2021/8829; G01N 2021/8883; G01N 21/17; G01N 21/3586; G01N 21/8851; G01N 23/04; G02B 21/0012; G02B 17/08; G02B 21/20; G02B 21/361; G02B 21/362; G02B 21/367; G02B 21/368; G02B 27/022; G02B 27/026; G02B 13/06; G02B 23/2415; G02B 23/2484; G02B 13/22; G02B 21/16; G02B 21/22; G01B 11/16; G01B 11/26; G01B 15/00; G01B 2290/55; G01B 9/02; G01B 11/25; G01B 11/30; G01B 15/08; G01B 11/02; G01B 11/245

See application file for complete search history.

(56) References Cited

U.S. PATENT DOCUMENTS

| | | | | |
|---|---|---|---|---|
| 5,945,685 | A * | 8/1999 | Imaino | G01N 21/94 |
| | | | | 250/559.45 |
| 6,122,056 | A * | 9/2000 | Hibbs | G03F 1/84 |
| | | | | 356/450 |
| 7,289,200 | B1 | 10/2007 | Strafford et al. | |
| 7,345,754 | B1 | 3/2008 | Zhao et al. | |
| 7,738,090 | B1 * | 6/2010 | Lee | G03F 1/84 |
| | | | | 356/237.2 |
| 2006/0012780 | A1 * | 1/2006 | Nishiyama | G01N 21/95 |
| | | | | 356/237.4 |
| 2007/0121106 | A1 * | 5/2007 | Shibata | G06T 7/001 |
| | | | | 356/237.2 |
| 2008/0062422 | A1 * | 3/2008 | Thomas | G01N 21/896 |
| | | | | 356/432 |
| 2008/0174771 | A1 * | 7/2008 | Yan | G01N 21/8901 |
| | | | | 356/237.5 |
| 2010/0051834 | A1 * | 3/2010 | Lopatin | G01N 21/896 |
| | | | | 250/553 |
| 2015/0377797 | A1 * | 12/2015 | Kolchin | G01N 21/9501 |
| | | | | 356/237.5 |

FOREIGN PATENT DOCUMENTS

| | | | | |
|---|---|---|---|---|
| CN | 104081192 | A | 10/2014 | |
| CN | 105548212 | A | 5/2016 | |
| DE | 102005035552 | A1 * | 2/2007 | ............ G02B 21/10 |
| KR | 2012-0063561 | A | 6/2012 | |
| KR | 10-1695563 | B1 | 1/2017 | |
| WO | 2016/043397 | A1 | 3/2016 | |
| WO | 2018/048843 | A1 | 3/2018 | |

* cited by examiner

METHODS AND APPARATUS FOR DETECTING SURFACE DEFECTS ON GLASS SHEETS

CROSS-REFERENCE TO RELATED APPLICATIONS

This application claims the benefit of priority under 35 U.S.C. § 371 of International Application No. PCT/US18/59921, filed on Nov. 9, 2018, which claims the benefit of priority of U.S. Provisional Application Ser. No. 62/586,367 filed on Nov. 15, 2017 the contents of which are relied upon and incorporated herein by reference in their entirety as if fully set forth below.

FIELD

The present disclosure relates to methods and apparatus for optical inspection, and in particular to methods and apparatus for detecting surface defects on a sheet of material, such as a sheet of glass.

BACKGROUND

Transparent sheets of material, for example glass, gem or mineral (e.g., sapphire), or polymer sheets, are used in a variety of different device applications, including as display panels such as LCD (liquid-crystal display) panels and/or as protective covers for such panels. Such display devices and the panels that comprise them, are being made increasingly thinner and lighter, whereby it is desirable that the sheets of material be increasingly thinner and lighter as well.

The typical transparent sheet for a display panel or cover is made using a glass substrate. An original or starting glass substrate can be thinned using a mechanical process, e.g., grinding and polishing, or a chemical process, e.g., etching and polishing, to achieve a desired thickness (e.g., from about 0.1 mm to about 0.7 mm) for the final glass sheet. During the thinning process, surface defects can be formed. For example, during chemical thinning, defects in the form of dips (indentations) and/or bumps (protrusions, also respectively referred to as "dimples" or "pimples") can be formed in or on the glass surfaces. The typical lateral extent of the defects can range from about 10 micrometers ($\mu$m) to a few millimeters (mm), and their typical vertical dimension (i.e., depth or height relative to the surface average) can be as large as a quarter of a micrometer. Such defects are readily visible in optical display devices, so thinned glass substrates should be inspected for surface defects so that the defect can be removed, or the faulty substrate destroyed.

Presently, manual methods are used to inspect sheets of material for defects. Unfortunately, manual inspection is labor-intensive, inconsistent and time consuming. For example, it can take many hours to inspect a large, production-sized sheet. There may also be difficulty determining the orientation of a defect. That is, the detection apparatus may not exhibit an isotropic detection capability.

What is needed is a detection apparatus capable of detecting defects, e.g., scratches, in large-size sheets of material, such as glass sheets, without sensitivity to the orientation of the defect.

SUMMARY

In accordance with the present disclosure, a method of detecting defects on a surface of a glass sheet is disclosed, comprising collimating a beam of light emitted from a light source and intersecting the collimated beam of light with a beam splitter. The beam splitter directs a first portion of the intersected beam of collimated light toward a first surface of the glass sheet such that the directed portion of the intersected beam of collimated light illuminates the first surface of the glass sheet. A first portion of the light illuminating the first surface of the glass sheet is reflected by the first surface and a second portion of the light illuminating the first surface of the glass sheet is scattered by a defect. The method further comprises receiving the reflected light and the scattered light with a first lens element, the first lens element directing the reflected light and the scattered light to an inverse aperture, wherein the reflected light is blocked by the inverse aperture and the scattered light is transmitted by the inverse aperture. The method may still further comprise directing the scattered light transmitted by the inverse aperture with a second lens element to an imaging device and detecting the scattered light.

The light source may be a laser, a light emitting diode, or a white light source. The light source may comprise or emit one or more visible wavelengths.

The method may further comprise wherein the reflected light is blocked by an opaque disc that comprises the inverse aperture, and the scattered light is transmitted by a transparent region surrounding the opaque disc.

In some embodiments, a second portion of the collimated light intersecting the beam splitter is subsequently incident on a beam dump.

In some embodiments, the glass sheet is moved from a first position where the directed portion of the intersected beam of collimated light does not illuminate the surface of the glass sheet to a second position where the directed portion of the intersected beam of collimated light illuminates the first surface of the glass sheet, the method further comprising: monitoring the glass sheet as the glass sheet is moved from the first position to the second position; monitoring the light emitted by the light source and adjusting an output power of the light source if the light source output power varies from a predetermined output power when the glass sheet is in the first position; and disabling monitoring the light emitted by the light source when the glass sheet is in the second position.

The first and second lens elements can comprise a lens assembly, and in some embodiments, the method further comprises shifting a focal point of the lens assembly to a second surface of the glass sheet opposite the first major surface, or shifting a focal point of the lens assembly to a location intermediate the first major surface and the second major surface.

In still another embodiment, a method of detecting defects on a surface of a glass sheet is described, comprising: conveying a glass sheet in a conveyance direction, a plurality of defect detection modules arrayed across a lateral dimension of the glass sheet in a first array, each defect detection module: collimating a beam of light emitted from a light source; intersecting the collimated beam of light with a beam splitter, the beam splitter directing a first portion of the intersected beam of collimated light toward a first surface of the moving glass sheet such that the directed portion of the intersected beam of collimated light illuminates the first surface of the glass sheet, wherein a first portion of the light illuminating the first surface of the glass sheet is reflected by the first surface and a second portion of the light illuminating the first surface of the glass sheet is scattered by a defect; receiving the reflected light and the scattered light with a first lens element, the first lens element directing the reflected light and the scattered light to an inverse aperture, wherein the reflected light is blocked by the inverse aperture and the scattered light is transmitted by the inverse aperture; and directing with a second lens element the scattered light transmitted by the inverse aperture to an imaging device and detecting the scattered light.

The first array of defect detection modules may be, for example, a linear array.

In some embodiments, the conveyance direction is orthogonal to a direction of the linear first array of defect detection modules.

In some embodiments, the plurality of defect detection modules can comprise a second array of defect detection modules opposite the first array of defect detection modules.

In some embodiments, the glass sheet is conveyed in the conveyance direction from a first position where, for each defect detection module the directed portion of the intersected beam of collimated light does not illuminate the surface of the glass sheet to a second position where the directed portion of the intersected beam of collimated light illuminates the first surface of the glass sheet, the method further comprising: monitoring the glass sheet as the glass sheet is moved from the first position to the second position; monitoring for each defect detection module the light emitted by the light source and adjusting an output power of the light source if the light source output power varies from a predetermined output power when the glass sheet is in the first position; and for each defect detection module disabling monitoring the light emitted by the light source when the glass sheet is in the second position For each defect detection module the first and second lens elements can comprise a lens assembly, wherein the method further comprises shifting a focal point of the lens assembly, for example shifting the focal point within a thickness of the glass sheet In still another embodiment, an apparatus for detecting surface defects on a sheet of material is disclosed, comprising: a light source; a beam splitter, the beam splitter configured to intercept and directing a first portion of the intersected beam of collimated light toward a first surface of the glass sheet such that the directed portion of the intersected beam of collimated light illuminates the first surface of the glass sheet, wherein a first portion of the light illuminating the first surface of the glass sheet is reflected by the first surface and a second portion of the light illuminating the first surface of the glass sheet is scattered by a defect; a lens assembly comprising a first lens element and a second lens element; an inverse aperture positioned between the first and second lens elements, the inverse aperture configured to block the background light and transmit the scattered light; and an imaging device configured to detect the transmitted scattered light.

Additional features and advantages of the embodiments disclosed herein will be set forth in the detailed description that follows, and in part will be readily apparent to those skilled in the art from that description or recognized by practicing the embodiments as described herein, including the detailed description which follows, the claims, as well as the appended drawings.

It is to be understood that both the foregoing general description and the following detailed description present embodiments intended to provide an overview or framework for understanding the nature and character of the embodiments disclosed herein. The accompanying drawings are included to provide further understanding, and are incorporated into and constitute a part of this specification. The drawings illustrate various embodiments of the disclosure, and together with the description serve to explain the principles and operations thereof.

DETAILED DESCRIPTION

Figure 1:
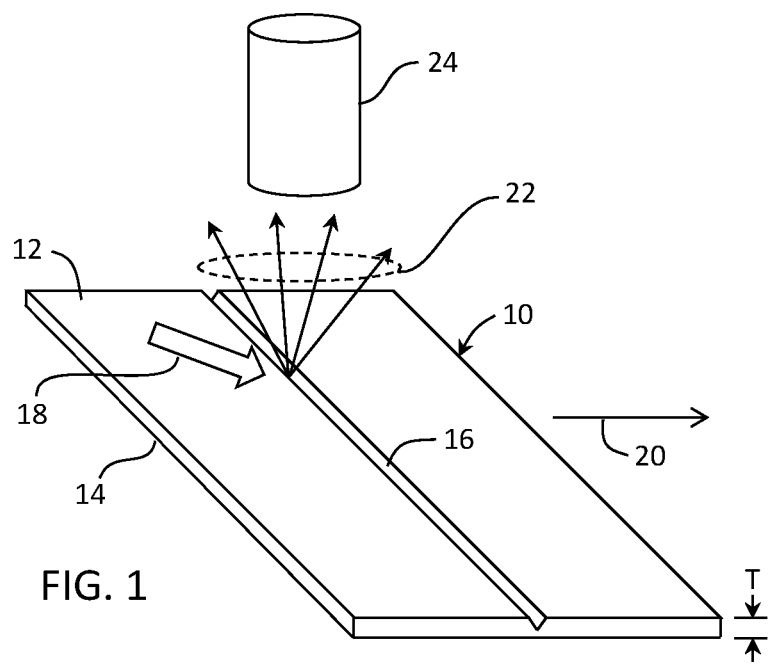
FIGS. 1 and 2 are perspective views of a glass sheet under inspection, illustrating how the observability of a defect can be dependent on orientation of the defect and the angle of illumination.

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value to the other particular value. Similarly, when values are expressed as approximations by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply ab solute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

Current methods for detecting surface defects in a sheet of material, for example a transparent material such as a glass sheet, comprises projecting a collimated light through the glass sheet as the glass sheet is conveyed in a conveyance direction, and imaging the glass sheet (e.g., the portion illuminated by the collimated light) onto a sensor. While embodiments of the present disclosure may be suitable for use with either opaque or translucent materials, such embodiments have been shown to be particularly effective for transparent materials, as imaging of surface defects can be obtained from both major surfaces of the glass sheet without the need for separate apparatus positioned adjacent opposing major surfaces. It has been found, however, that the orientation of certain defects, such as a scratch, relative to the direction and angle of light used to illuminate the defect can affect the detectability of the defect. For example, scratches are typically elongated defects and therefore can exhibit a discernible direction. Such elongated defects may be aligned in the illumination direction, orthogonal to the illumination direction, or at an intermediate angle therebetween (recognizing also that a particular defect may not be entirely linear). The imaging of such defects can be inhibited if the illumination is of a low (grazing) angle relative to the surface of incidence and the defect direction aligns with the direction of the illumination.

FIG. 1 illustrates an exemplary glass sheet 10 comprising a first major surface 12 and a second major surface 14 opposing first surface 12, first and second major surfaces 12, 14 defining a thickness T therebetween. Glass sheet 10 may, in some embodiments, be a transparent glass sheet, e.g., transparent to the illuminating light. As used herein, transparent shall be construed to mean a transmittance of the material is equal to or greater than 90% at the wavelength (e.g., central wavelength) of the illumination. First surface 12 may be parallel, or substantially parallel, with second surface 14, and thickness T can be, for example, equal to or less than about 2 mm, for example equal to or less than about 1.5 mm, equal to or less than about 1 mm, equal to or less than about 0.7 mm, equal to or less than about 0.5 mm, equal to or less than about 0.3 mm, or equal to or less than about 0.1 mm. However, in further embodiments, thickness T can be greater than 2 mm, as the detection of surface defects, particularly defects on the surface facing the detection apparatus, are not generally affected by the thickness of the sheet of material. In accordance with the present embodiment, first surface 12 is shown comprising a scratch 16 extending orthogonal to an incident light 18 originating from a side of the glass sheet with a low angle of incidence relative to first surface 12. Glass sheet 10 is conveyed in a conveyance direction 20, also orthogonal to scratch 16. Incident light 14 is subsequently scattered by scratch 16 in a direction generally orthogonal to the direction of the scratch. That is, if the incident light is considered to lie in a plane orthogonal to the surface of the glass sheet and orthogonal to the scratch, then the scattered light 20 from the scratch lies generally in that same plane and the scattered light 22 can be collected by detector 24. This is, of course, a simplification, since this scattered light is not ordinarily or necessarily planar, but is sufficiently instructive to the discussion.

Figure 2:
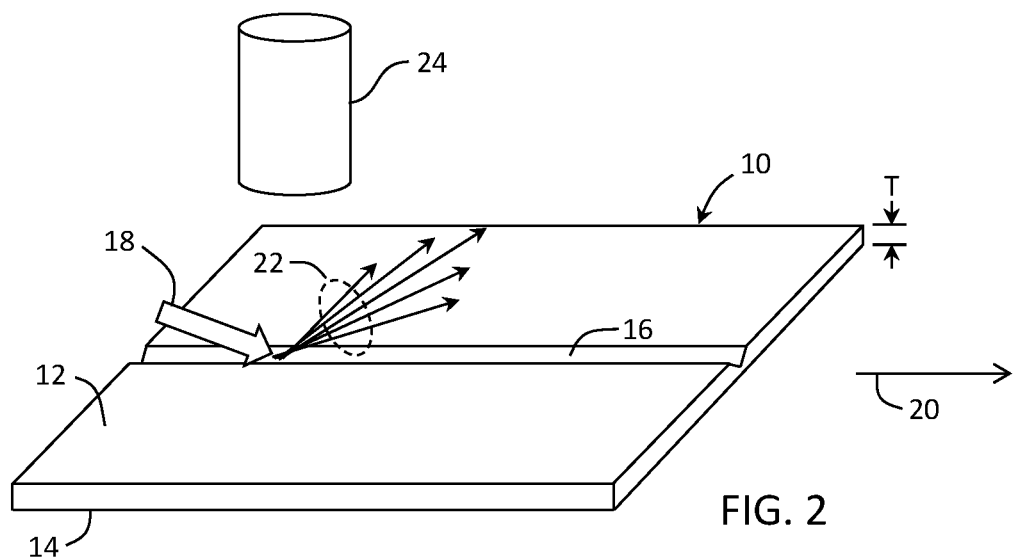

FIG. 2 illustrates exemplary glass sheet 10 arranged so that scratch 16 extends parallel to incident light 18 and parallel to conveyance direction 20. Incident light 18, again illuminating the scratch from a low angle relative to first surface 12, is subsequently scattered by the scratch in a direction along the direction of the scratch. In this instance, the detectability of the scattered light 22 depends on the direction of the scratch and the angle of incidence. If the angle of incidence is a small angle relative to the surface of glass sheet 10, for example within 20 degrees, then the scattering angles will largely also be at a small angle. The scattered light in this instance may not be received by detector 24, or be sufficiently weak that it is not easily detected. Accordingly, FIGS. 1 and 2 illustrate how low angle illumination combined with the directionality of a defect can result in problematic detection of the defect.

Figure 3:
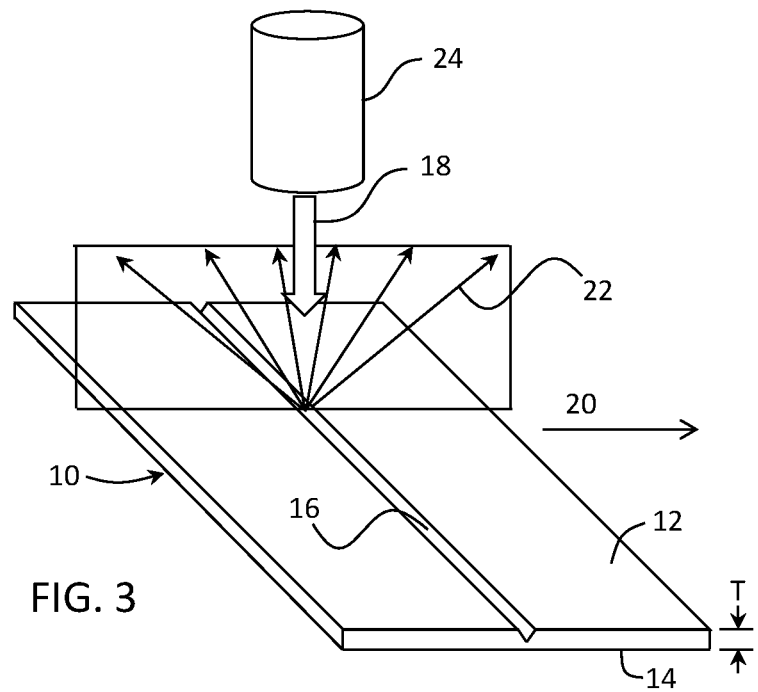
FIGS. 3 and 4 are perspective views of a glass sheet under inspection, illustrating how the observability of a defect can be made independent of the orientation of the defect under orthogonal illumination.
Figure 4:
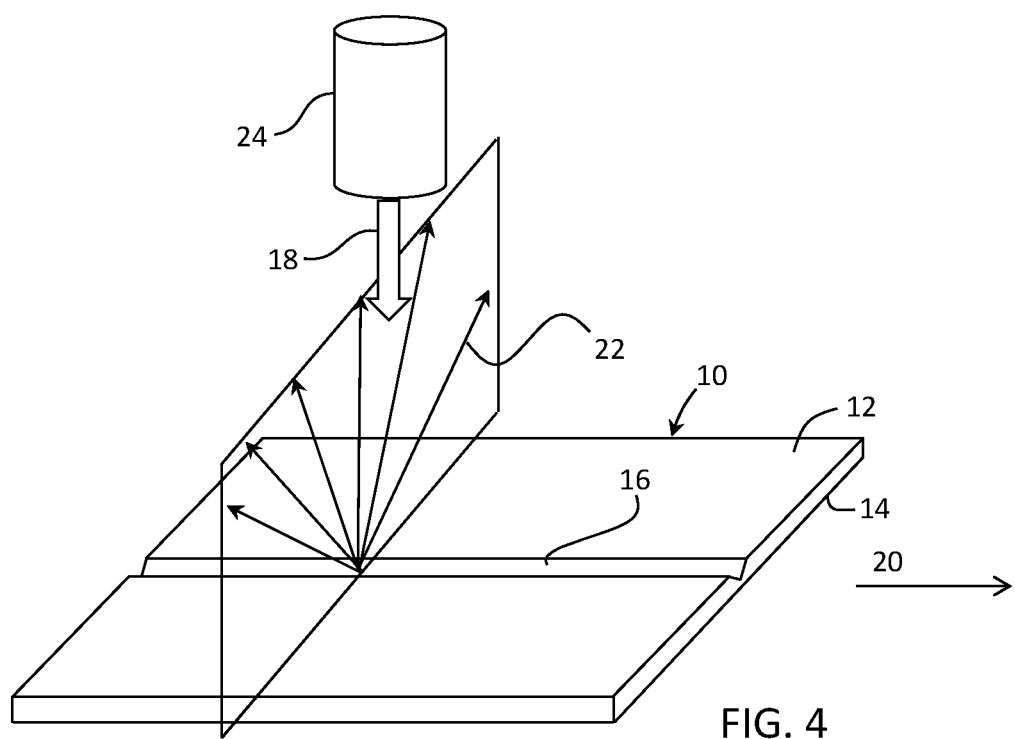

On the other hand, FIGS. 3 and 4 depict a situation where incident light 18 is directed orthogonal to, or substantially orthogonal to, first surface 12 of glass sheet 10 (incident light 18 shown generally coincident with an axis of detector 24 in the figure), and detectability of the scratch is not dependent on the orientation of the scratch (for simplicity, scattering of incident light 18 by the scratch 16 is shown in single, orthogonal planes in FIGS. 3 and 4). Thus, FIG. 3 illustrates glass sheet 10 moving in a conveyance direction 20 orthogonal to scratch 16 and scattered light 20 extends in a plane orthogonal to scratch 16. FIG. 4 depicts glass sheet 10 moving in a conveyance direction 20 parallel with scratch 16 and scattered light 20 extending in a plane parallel to scratch 16. In both cases, the scattered light 20 can be received by detector 24, which includes a detection axis that is orthogonal to the major surface(s) of the glass sheet.

Figure 5:
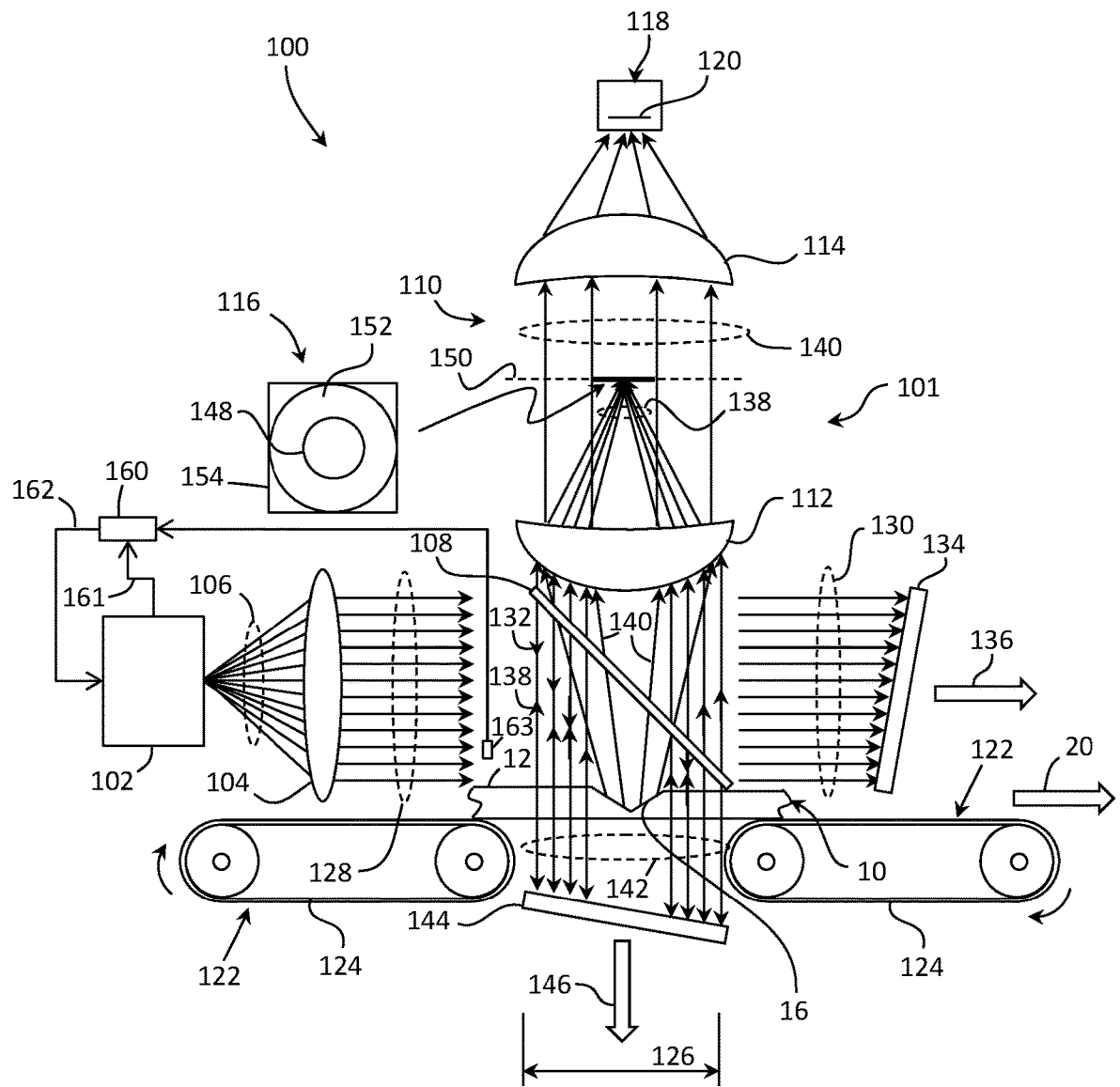
FIG. 5 is a schematic view of an exemplary defect detection apparatus according to embodiments of the present disclosure.

With the foregoing in mind, FIG. 5 illustrates an exemplary detection apparatus 100 configured to provide isotropic defect detection of surface defects on a sheet of material using the principals of FIGS. 3 and 4. For the purpose of illustration and not limitation, the sheet of material on which defects are to be detected will be described as a transparent glass sheet, such as a visually transparent glass sheet suitable for the manufacture of display devices. Accordingly, defects may include but are not limited to pimples, dimples (such as dimples resulting from a molding operation), surface residue, scratches, stones (e.g., unmelted raw material used to produce glass sheets), adhered glass chips, fibers or other particles adhered to a surface of the sheet, surface inclusions, and stains. As used herein, isotropic defect detection refers to the detection of surface defects without dependency on the orientation of the defect, particularly an orientation in a plane of the glass sheet surface(s). Apparatus 100 comprises a detection module 101 including a light source 102, a collimator 104 arranged to collimate light 106 emitted by light source 102, a beam splitter 108 positioned to intercept collimated light 106, a lens assembly 110 comprising a first, front lens element 112 and a second, rear lens element 114, and an inverse aperture 116 positioned between first and second lens elements 112, 114. Lens assembly 110 may, for example, comprise a telecentric lens.

Detection module 101 may further include an imaging device 118 comprising an imaging sensor 120. Imaging sensor 120 may, in some embodiments, be connected to a controller and optionally a computing system, optionally a monitor (display device) and optionally a recording device, depending on how the images acquired by imaging sensor 120 are to be viewed and/or saved for future viewing and/or analysis.

Detection apparatus 100 may still further comprise a conveyance apparatus 122 configured to convey the glass sheet past detection module 101 in conveyance direction 20. Conveyance apparatus 122 may include, for example, one or more endless belts 124 arranged to transport glass sheet 10 in conveyance direction 20. Conveyance apparatus 122 may include a gap 126 positioned such that first surface 12, where light from light source 102 (e.g., light reflected by beam splitter 108) is incident, is unobstructed (e.g., sized and positioned to accommodate—not obstruct—a field of view of lens 110). For example, conveyance apparatus 122 may comprise at least two endless belts arranged in loops with a gap between ends of the loops. In other embodiments, conveyance apparatus 122 may comprise air bearings, for example multiple air bearings positioned end-to-end with a gap therebetween, wherein glass sheet 10 is conveyed over the air bearings from a first air bearing, over the gap, and on to the next air bearing. While glass sheet 10 is illustrated as being conveyed in a horizontal direction, the apparatus and methods disclosed herein may be configured in other orientations. For example, glass sheet 10 may be positioned in a vertical orientation, or in an off-vertical orientation (for example at an angle of 5 degrees to 20 degrees, and supported by air bearings). One of ordinary skill in the art can easily contemplate other glass sheet orientations and methods of conveyance, and embodiments described herein are not particularly limited by the configurations illustrated in the appended drawings.

Still referring to FIG. 5, light 106 emitted by light source 102 is collimated by collimator 104 and the collimated light 128 is incident on beam splitter 108. Beam splitter 108 splits the incident collimated light 128 into two beams: One beam (represented by rays 130) is transmitted through beam splitter 108, and a second beam (represented by rays 132) is reflected downward, toward and orthogonal, or substantially orthogonal, to first surface 12 of glass sheet 10. As used herein, substantially orthogonally is intended to mean within 20 degrees of perpendicular to the reference surface or direction, e.g., first surface 12, such as within 10 degrees, within 5 degrees, or within 1 degree. The light 130 transmitted through beam splitter 108 may be captured (e.g., absorbed) by a first beam dump 134. For example, first beam dump 134 may include a component comprising a surface with a dark (e.g., black) material configured to absorb light incident on the beam dump. The component can be made absorbing, for example, by painting or otherwise coating the component surface with light absorbing material, examples of which can include a matte black paint, a carbon layer, an anodized layer or any other suitable absorbing layer or material. In embodiments, absorbing components of first beam dump 134 can be angled relative to beam direction 136 of transmitted light 130 to prevent any light reflected from beam dump 134 from being directed toward light source 102 or reflected by beam splitter 108 in a direction toward detection device 118. In embodiments, the absorbing component can be a coated plate, although in further embodiments, the absorbing component can comprise many coated plates arranged at angles relative to each other.

A first portion of second beam 132 incident on first surface 12 of glass sheet 10 is reflected from first surface 12, transmitted through beam splitter 108, and collected by lens assembly 110 as background light 138, and a second portion of second beam 132 incident on a defect (e.g., scratch 16) is scattered by the defect in a direction generally toward lens assembly 110 and captured thereby as scattered light 140. Still another (third) portion 142 of light 132 reflected by beam splitter 108 may be transmitted through glass sheet 10 and can be absorbed by second beam dump 144. For example, like first beam dump 134, second beam dump 144 may comprise a component with a surface comprising a dark (e.g., black) material configured to absorb light incident on material. The component can be made absorbing, for example, by painting or otherwise coating the component surface with light absorbing material, examples of which can include a matte black paint, a carbon layer, an anodized layer or any other suitable absorbing layer or material. In embodiments, the absorbing component can be angled relative to the beam direction 146 (orthogonal to major surfaces 12, 14) of that portion of the collimated light transmitted through glass sheet 10 to prevent light reflected from second beam dump 144 from being directed toward imaging device 118 or light source 102. In embodiments, the absorbing component can be a simple coated plate, although in further embodiments, the absorbing component can comprise many coated plates arranged at angles relative to each other.

Still referring to FIG. 5, background light 138 is focused by front lens element 112 onto the opaque central disc 148 of inverse aperture 116 located at the back focal plane 150 of first lens element 112, where the background light 138 is absorbed. The light 140 scattered by defect 16 is transmitted through the transparent region 152 surrounding opaque central disc 148 of inverse aperture 116 and is focused by second lens element 114 onto imaging sensor 120 of imaging device 118.

Light source 102 can comprise a laser, or in other embodiments light source 102 can comprise a light emitting diode (LED). The laser or the LED can emit any suitable wavelength, or group of wavelengths detectable by imaging device 118. For example, in embodiments, the laser or LED can emit light in the visible wavelength (e.g., in a range from about 400 nanometers (nm) to about 700 nm). In some embodiments, light source 102 can comprise a white light source, for example an incandescent bulb.

Beam splitter 108 can be any suitable beam splitter. For example, in some embodiments, beam splitter 108 can be a half-silvered mirror, for example a pellicle mirror. Other beam splitter designs may be used, depending on the wavelength of incident light, intended defect type to be detected, etc., and such designs are well known to those skilled in the art.

Imaging device 118 can be a camera, or other suitable imaging device, for example a line scanning camera, wherein imaging sensor 120 can be a line sensor aligned orthogonal, or substantially orthogonal, to conveyance direction 20.

In some embodiments, inverse aperture 116 comprises an opaque central disc 148 supported by wires or other thin material extending from an outer material 154 defining, in combination with opaque central disc 148, an annular transparent region 152 surrounding opaque central disc 148. However, such support members may interfere with isotropic detection. Accordingly, in preferred embodiments, inverse aperture 116 comprises a transparent plate, such as a glass plate, comprising a mask material deposited thereon, the mask material comprising an inner mask (i.e., opaque central disc 148) and an outer mask 154 defining an outer circumference of transparent region 152 (an annular transparent region 152 thereby defined between outer mask 154 and opaque central disc 148), wherein no opaque supporting or connecting element extends between outer mask material and the inner mask material. Inverse aperture 116 can then be permanently mounted within lens 110, or lens 110 can be constructed with a port or other opening allowing the insertion and/or removal of inverse aperture 116 (or the insertion and/or removal of any other desired aperture or filter).

To stabilize light source power output, a photodiode (not shown) may be positioned to monitor laser light from the light source, e.g., from the laser photodiode. Output from the light source can be detected and an appropriate signal delivered to a controller 160 through data line 161, thereby establishing a control loop configured to monitor and adjust the light source output power. For example, if the output power of a laser light source drifts away from a predetermined power set point, controller 160 can adjust power modulation of the laser (e.g., photodiode) through data line 162 such that the output power of the laser is returned to the predetermined power set point.

In accordance with embodiments described herein, if there is no glass sheet being inspected (e.g., no glass sheet 10 within or adjacent gap 126), controller 160 can be programmed to control the laser. However, when a sheet of glass is being inspected, reflected light, for example light reflected from beam splitter 108 in a direction toward light source 102, the reflected light may enter and scatter inside the laser. This makes the photo diode output appear greater that it actually is. Consequently, controller 160 will try to lower the laser power. Accordingly, the actual laser output power may be too low for inspection.

To overcome the foregoing issue, a glass sheet proximity sensor 163 can be positioned to detect the incoming glass sheet. Since the glass sheet conveyance speed will be known, a timing circuit within controller 160 can be used wherein controller 160 disables the feedback control whenever a glass sheet is in front of the detection apparatus. Thus, the feedback control of the laser is enabled when there is no glass under inspection, (e.g., the glass sheet is not over (e.g., obstructing) gap 126. Alternatively, direct detection of the presence or absence of a glass sheet at the gap can be performed, which does not require a speed and position calculation. The foregoing light source power control may be employed with other light sources, for example LED light sources.

Figure 6:
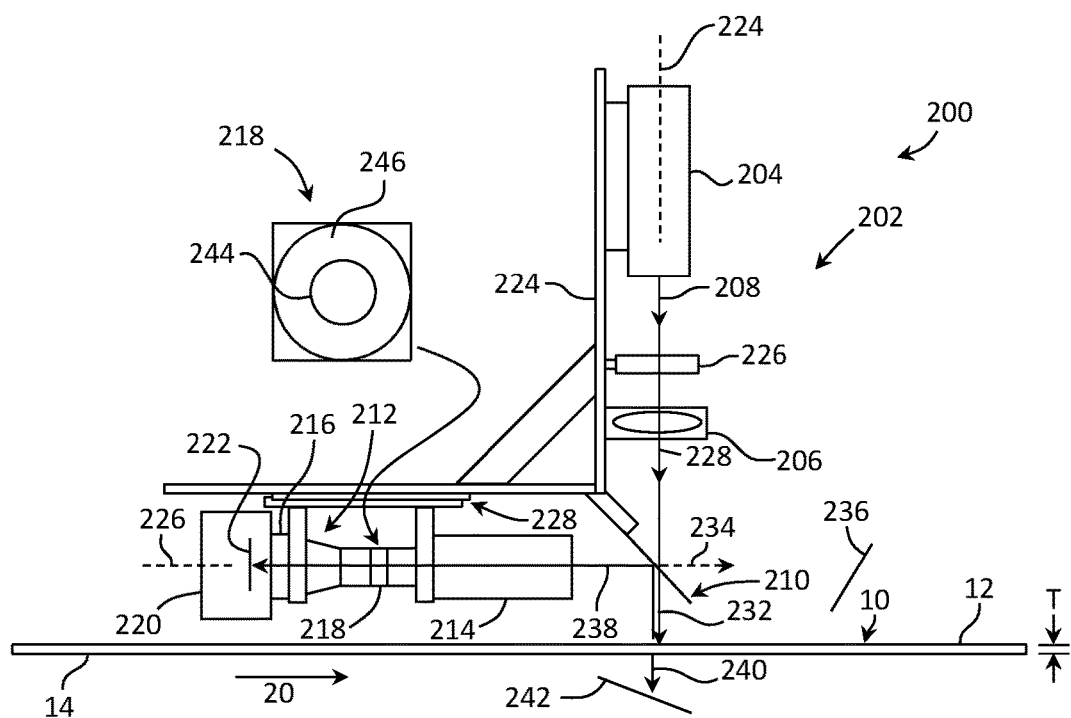
FIG. 6 is a schematic view of another exemplary defect detection apparatus.

It should be apparent with the benefit of the foregoing description that the arrangement of the detection apparatus components can be altered, for example to obtain a more compact implementation. Shown in FIG. 6 is another exemplary detection apparatus 200 configured to provide isotropic defect detection. Detection apparatus 200 comprises a detection module 202 including a light source 204, a collimator 206 arranged to collimate light 208 emitted by light source 102, a beam splitter 210, a lens assembly 212 comprising a first, front lens element 214 and a second, rear lens element 216, and an inverse aperture 218 positioned between first and second lens elements 214, 216. Lens assembly 212 may, for example, comprise a telecentric lens. Detection module 202 may further include an imaging device 220 comprising an imaging sensor 222. Any one or more of the foregoing components can be mounted on a frame 224 to establish and/or maintain a spatial relationship between selected components.

Detection apparatus 200 may optionally include field stop 226 arranged to block outlying regions of the light emitted by light source 204. Detection apparatus 200 may also further include a focusing device 228 configured to move lens 212 relative to beam splitter 210 (and glass sheet 10), thereby moving a focus point of the lens assembly between first major surface 12 and second surface 14. Thus, the focus point of lens 212 can be moved from first major surface 12 to second major surface 14, or to any point through the thickness T of the glass sheet between the first and second major surfaces. Focusing device 228 can comprise, for example, a linear rail or stage assembly that allows movement of lens 212 relative to beam splitter 210 and glass sheet 10. That is, movement of lens 212 varies an optical path length between the lens assembly and the glass sheet. Thus, in some embodiments lens assembly 212 may be mounted to frame 224 via focusing device 228, and a position of lens assembly 212 may be adjusted by adjusting a position of focusing device 228. In some embodiments, focusing device 228 may be adjusted manually by a screw assembly, although in further embodiments, focusing device may include adjustment via a motor, for example a servomotor in engagement with focusing device 228. In some embodiments, focusing can be achieved via remote control, or even automatically. One skilled in the art can easily arrange the appropriate components to achieve remote or automatic focusing control. One can readily observe that focusing device 228 can be used with other embodiments described herein.

Operation of the present embodiment is similar to the operation of the previous embodiment. Light source 204 is arranged such that emitted light 208 is directed orthogonal, or substantially orthogonal, to first major surface 12 of glass sheet 10. That is, light 208 is emitted along first optical axis 224 in a direction toward and orthogonal to first major surface 12, and second optical axis 226 of lens 212 is arranged parallel to first major surface 12 (and orthogonal to first optical axis 224). Emitted light 208 is collimated by collimator 206 and the collimated light 228 is incident on beam splitter 210. Beam splitter 210 splits the incident collimated light 228 into two beams, one beam (represented by ray 232) is transmitted through beam splitter 210 toward first surface 12 of glass sheet 10, and a second beam (represented by ray 234) is reflected from beam splitter 210 in a direction orthogonal to transmitted beam 230, toward first beam dump 236. The light 234 reflected by beam splitter 210 may be captured (e.g., absorbed) by first beam dump 236. For example, first beam dump 236 may comprise an absorbing component configured to absorb light incident on the absorbing component. The absorbing component can be made absorbing, for example, by painting or otherwise coating a surface of the absorbing component with light absorbing material, examples of which can include a matte black paint, a carbon layer, or any other suitable absorbing material. In embodiments, the absorbing component can be angled relative to the propagation direction of reflected beam 234 to prevent light that might be reflected from the beam dump from being directed back in a direction toward light source 204.

A portion of first beam 232 incident on first surface 12 of glass sheet 10 is reflected from first surface 14 of glass sheet 10 back toward beam splitter 210, then reflected from beam splitter 210 in a direction toward and collected by lens assembly 212 as background light, and a second portion of first beam 232 incident on a defect on first major surface 12

(and/or second major surface 14) is scattered by the defect in a direction generally toward lens assembly 212 (After reflection from beam splitter 210) and captured by lens assembly 212 as scattered light (for simplicity, both the light reflected from first surface 12 and the scattered light are represented by a single ray 238). However, the behavior of the light reflected from first surface 12 of glass sheet 10 and the behavior of the scattered light, and the interaction of the reflected and scattered light with inverse aperture 218 are identical to the description in respect of detection module 101 and inverse aperture 116).

Still another (third) portion 240 of light 232 transmitted through beam splitter 210 and incident on first surface 12 may be transmitted through glass sheet 10 and can be captured (e.g., absorbed) by a second beam dump 242. For example, like first beam dump 236, second beam dump 242 may comprise an absorbing component configured to absorb light incident on the absorbing component. The sheet of material can be made absorbing, for example, by painting or otherwise coating the absorbing component with an absorbing material, examples of which can include a matte black paint, a carbon layer, or any other suitable absorbing material. In embodiments, the absorbing component can be angled relative to the incident beam 240 transmitted through glass sheet 10 to prevent any light reflected from second beam dump 242 from being reflected back in a direction toward imaging device 220 or light source 204. In embodiments, the absorbing component can be a plate coated with a light absorbing material, although in further embodiments, the absorbing component can comprise many coated plates arranged at angles relative to each other.

Still referring to FIG. 6, the background light is focused by front lens element 214 onto opaque central disc 244 of inverse aperture 218 located at the back focal plane of first lens element 214, where the background light is absorbed. The light scattered by defect (e.g., scratch) 16 is transmitted through the transparent region 246 surrounding opaque central disc 244 of inverse aperture 218 and is focused by second lens element 216 onto imaging sensor 222 of imaging device 220.

Figure 7:
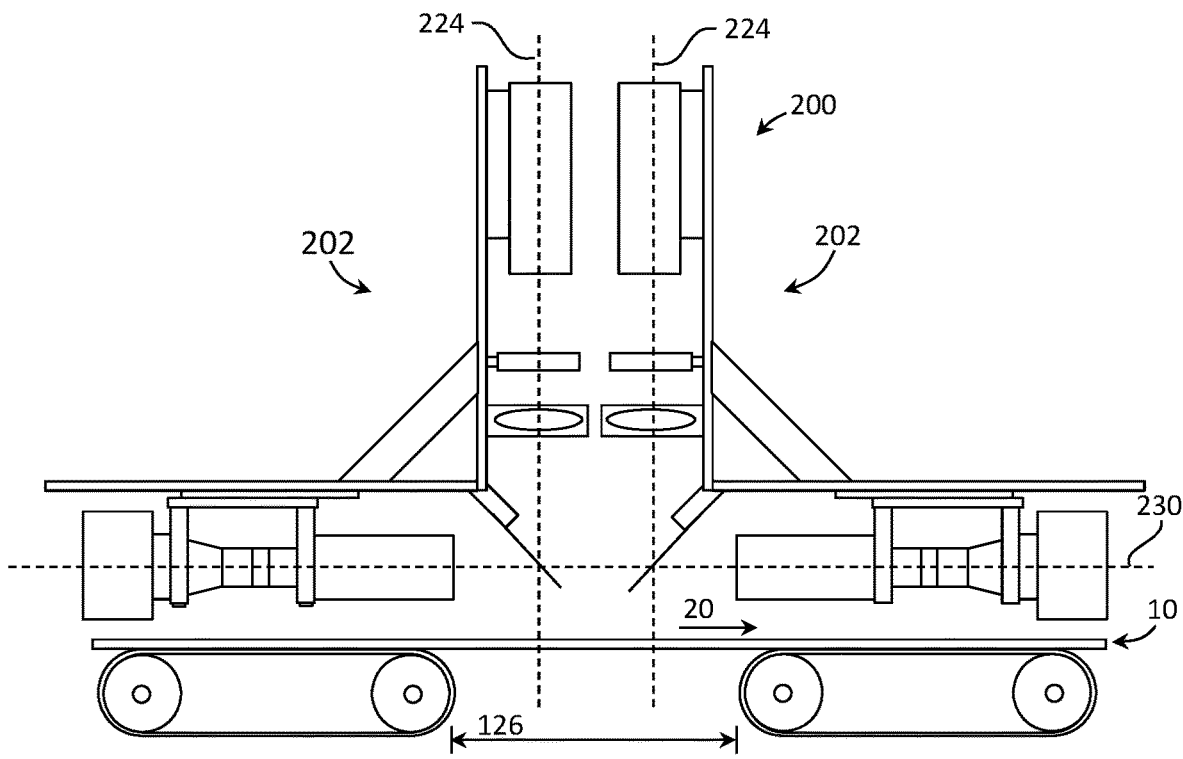
FIG. 7 is a schematic view of still another exemplary defect detection apparatus.
Figure 8:
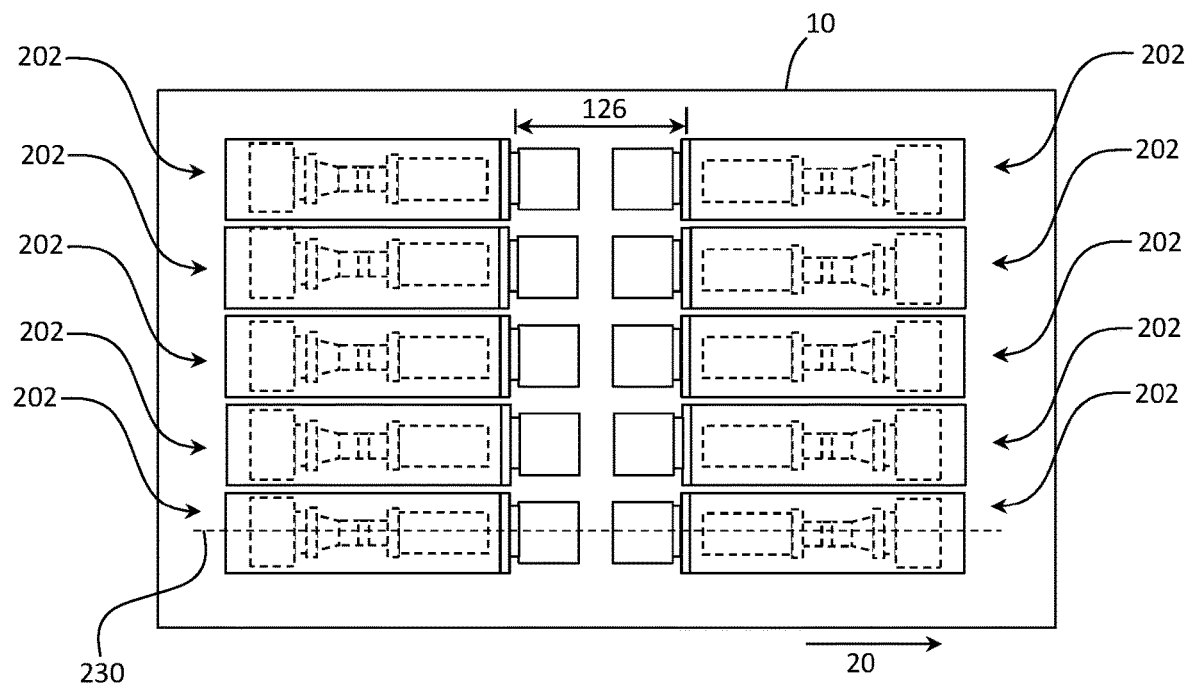
FIG. 8 is a schematic view of yet another exemplary defect detection apparatus.
Figure 9:
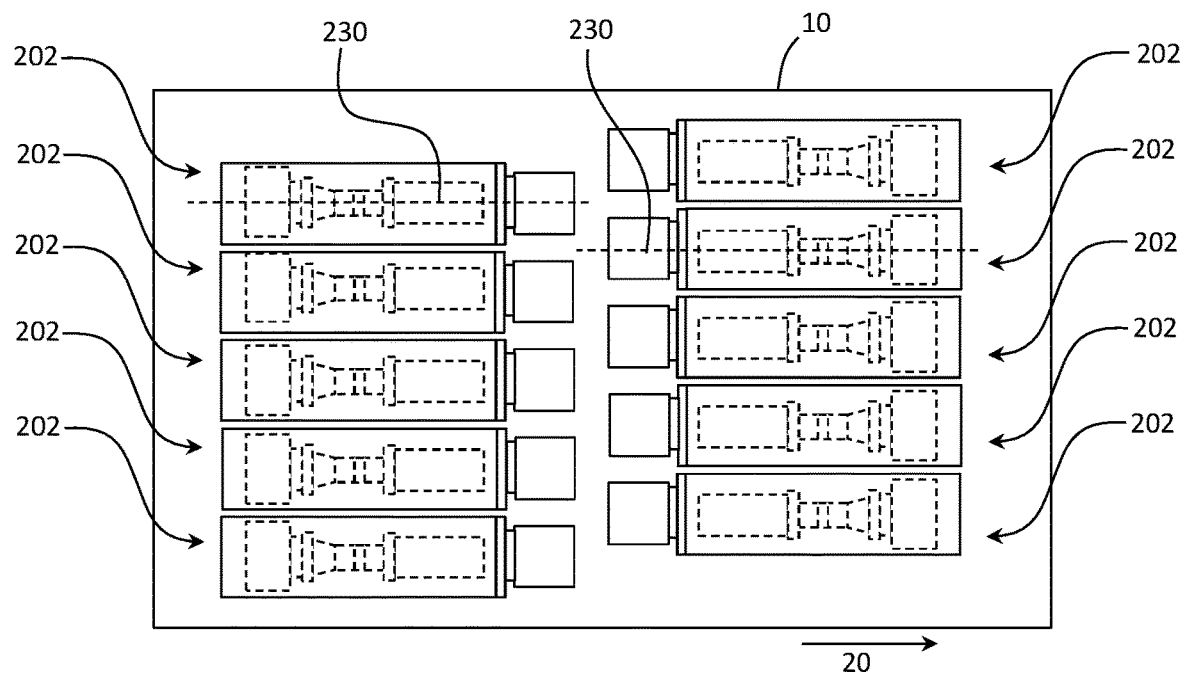
FIG. 9 is a schematic view of another exemplary defect detection apparatus.

It should be apparent, with the benefit of the above description, that in some instances the arrangement of components described supra may image a small portion of a subject glass sheet, particularly if the glass sheet is conveyed along conveyance direction 20. Accordingly, in embodiments, detection apparatus 200 (or 100) may comprise a plurality of detection modules 202 (or 101) arranged in an array across from and adjacent glass sheet 10. In some embodiments, the plurality of detection modules may be arranged in an opposing relationship, as illustrated in FIG. 7. Indeed, in embodiments, multiple rows of detection modules may be employed, and in some embodiments, opposing rows of detection modules as shown in FIG. 8. In some embodiments, the opposing rows of detection modules 202 (or 101) may be offset such that an optical axis of a lens assembly of one row extends between opposing lens assemblies of the opposing row (see FIG. 9). That is, the lens assembly is positioned across from an opposing gap between two lens assemblies of the opposing row of detection modules. In other embodiments, the optical axes of opposing lens assemblies can be coincident.

Figure 10:
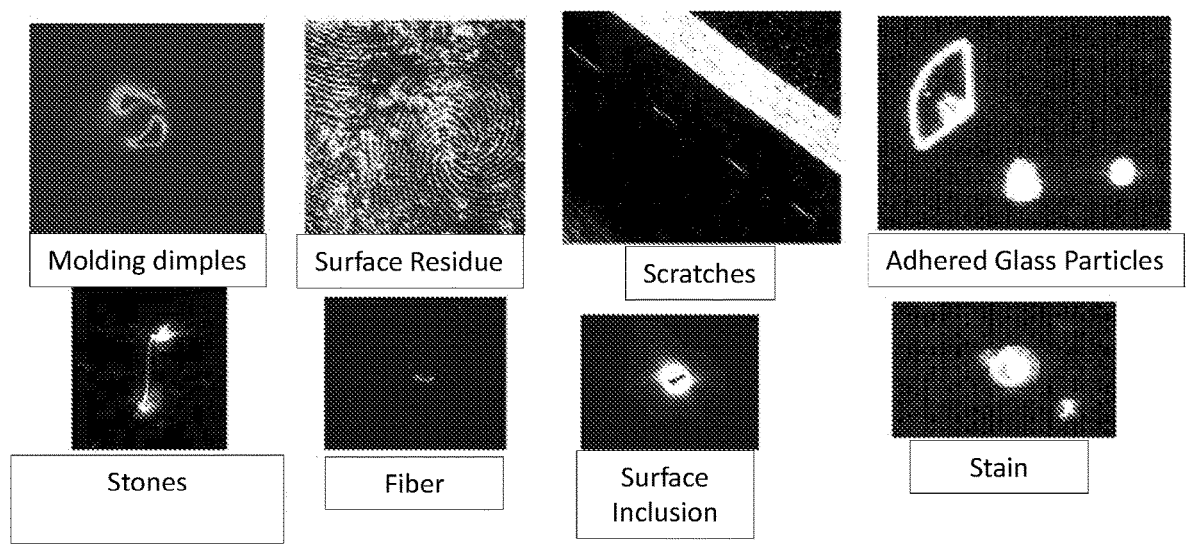
FIG. 10 is a series of photographs of various defects imaged using exemplary defect detection apparatus described herein.

FIG. 10 includes a series of images of different defects as viewed by detection apparatus of the present disclosure. The images show that a wide variety of surface defects can be detected using embodiments of the present disclosure.

It will be apparent to those skilled in the art that various modifications and variations can be made to embodiments of the present disclosure without departing from the spirit and scope of the disclosure. Thus it is intended that the present disclosure cover such modifications and variations provided they come within the scope of the appended claims and their equivalents.

What is claimed is:

1. A method of detecting defects on a surface of a glass sheet, comprising:
    collimating a beam of light emitted from a light source;
    intersecting the collimated beam of light with a beam splitter, the beam splitter directing a first portion of the intersected beam of collimated light toward a first surface of the glass sheet such that the directed portion of the intersected beam of collimated light illuminates the first surface of the glass sheet, wherein a first portion of the light illuminating the first surface of the glass sheet is reflected by the first surface and a second portion of the light illuminating the first surface of the glass sheet is scattered by a defect;
    receiving the reflected light and the scattered light with a first lens element, the first lens element directing the reflected light and the scattered light to an inverse aperture, wherein the inverse aperture comprises an opaque central disc and an annular transparent region surrounding the opaque central disc and the reflected light is blocked by the opaque central disc of the inverse aperture and the scattered light is transmitted by the annular transparent region of the inverse aperture; and
    directing with a second lens element the scattered light transmitted by the inverse aperture to an imaging device and detecting the scattered light.

2. The method according to claim 1, wherein the light source is a laser.

3. The method according to claim 1, wherein the light source comprises one or more visible wavelengths.

4. The method according to claim 1, wherein a second portion of the collimated light intersecting the beam splitter is subsequently incident on a beam dump.

5. The method according to claim 1, wherein the glass sheet is moved from a first position where the directed portion of the intersected beam of collimated light does not illuminate the surface of the glass sheet to a second position where the directed portion of the intersected beam of collimated light illuminates the first surface of the glass sheet, the method further comprising:
    monitoring the glass sheet as the glass sheet is moved from the first position to the second position;
    monitoring the light emitted by the light source and adjusting an output power of the light source if the light source output power varies from a predetermined output power when the glass sheet is in the first position; and
    disabling monitoring the light emitted by the light source when the glass sheet is in the second position.

6. The method according to claim 1, wherein the first and second lens elements comprise a lens assembly, the method further comprising shifting a focal point of the lens assembly to a second surface of the glass sheet opposite the first major surface.

7. The method according to claim 1, wherein the first and second lens elements comprise a lens assembly, the method further comprising shifting a focal point of the lens assembly to a location intermediate the first major surface and a second major surface opposite the first major surface.

8. A method of detecting defects on a surface of a glass sheet, comprising:

conveying a glass sheet in a conveyance direction adjacent a plurality of defect detection modules arrayed across a lateral dimension of the glass sheet in a first array, each defect detection module:
  collimating a beam of light emitted from a light source;
  intersecting the collimated beam of light with a beam splitter, the beam splitter directing a first portion of the intersected beam of collimated light toward a first surface of the moving glass sheet such that the directed portion of the intersected beam of collimated light illuminates the first surface of the glass sheet, wherein a first portion of the light illuminating the first surface of the glass sheet is reflected by the first surface and a second portion of the light illuminating the first surface of the glass sheet is scattered by a defect;
  receiving the reflected light and the scattered light with a first lens element, the first lens element directing the reflected light and the scattered light to an inverse aperture, wherein the inverse aperture comprises an opaque central disc and an annular transparent region surrounding the opaque central disc and the reflected light is blocked by the opaque central disc of the inverse aperture and the scattered light is transmitted by the annular transparent region of the inverse aperture; and
  directing with a second lens element the scattered light transmitted by the inverse aperture to an imaging device and detecting the scattered light.

9. The method according to claim 8, wherein the first array of defect detection modules is a linear array.

10. The method according to claim 9, wherein the conveyance direction is orthogonal to a direction of the linear first array of defect detection modules.

11. The method according to claim 8, wherein the plurality of defect detection modules comprises a second array of defect detection modules opposite the first array of defect detection modules.

12. The method according to claim 8, wherein the glass sheet is conveyed in the conveyance direction from a first position where, for each defect detection module the directed portion of the intersected beam of collimated light does not illuminate the surface of the glass sheet to a second position where the directed portion of the intersected beam of collimated light illuminates the first surface of the glass sheet, the method further comprising:
  monitoring the glass sheet as the glass sheet is moved from the first position to the second position;
  monitoring for each defect detection module the light emitted by the light source and adjusting an output power of the light source if the light source output power varies from a predetermined output power when the glass sheet is in the first position; and
  for each defect detection module disabling monitoring the light emitted by the light source when the glass sheet is in the second position.

13. The method according to claim 8, wherein for each defect detection module the first and second lens elements comprise a lens assembly, the method further comprising shifting a focal point of the lens assembly.

14. The method according to claim 12, wherein shifting a focal point of the at least one lens assembly comprises shifting the focal point within a thickness of the glass sheet.

15. An apparatus for detecting surface defects on a sheet of material, comprising:
  a light source;
  a collimator arranged to collimate light from the light source;
  a beam splitter configured to direct a first portion of the collimated light toward and orthogonal to a first surface of the glass sheet such that the directed portion of the collimated light illuminates the first surface of the glass sheet, wherein a first portion of the light illuminating the first surface of the glass sheet is reflected by the first surface and a second portion of the light illuminating the first surface of the glass sheet is scattered by a defect;
  a lens assembly comprising a first lens element and a second lens element and arranged to receive light from directed portion of the collimated light that is reflected from the first surface of the glass sheet and scattered from a defect on the first surface of the glass sheet;
  an inverse aperture positioned between the first and second lens elements, wherein the inverse aperture comprises an opaque central disc and an annular transparent region surrounding the opaque central disc and the reflected light is blocked by the opaque central disc of the inverse aperture and the scattered light is transmitted by the annular transparent region of the inverse aperture; and
  an imaging device positioned to receive the light scattered by the defect and passed by the inverse aperture.

16. The apparatus according to claim 15, wherein the inverse aperture is configured to block the light reflected from the first surface.

17. The method of claim 1, wherein the first lens element focuses the reflected light onto the opaque central disc of the inverse aperture.

18. The method of claim 8, wherein the first lens element focuses the reflected light onto the opaque central disc of the inverse aperture.

19. The apparatus of claim 15, wherein the first lens element focuses the reflected light onto the opaque central disc of the inverse aperture.

* * * * *